(12) United States Patent
Bond

(10) Patent No.: US 6,206,141 B1
(45) Date of Patent: Mar. 27, 2001

(54) GRAVITY MOTOR

(76) Inventor: Robert Bond, C.P. 1236, Sept-Iles, Qc (CA), G4R 4X7

(*) Notice: Subject to any disclaimer, the term of this patent is extended or adjusted under 35 U.S.C. 154(b) by 0 days.

(21) Appl. No.: 09/002,352

(22) Filed: Jan. 2, 1998

(51) Int. Cl.[7] .............................. F03G 3/00; B65D 88/54
(52) U.S. Cl. .............................................. 185/27; 222/252
(58) Field of Search .................................. 185/4, 6, 7, 27, 185/32, 33; 222/252, 282, 319, 322, 336, 408, 410, 415; 60/639; 290/54

(56) References Cited

U.S. PATENT DOCUMENTS 4,948,985 * 8/1990 Adams .................................... 290/54

FOREIGN PATENT DOCUMENTS

| 2273959 | 1/1976 | (FR) | ....................................... | 185/27 |
| 2594895 | 8/1987 | (FR) | ....................................... | 185/27 |
| 248817 | 11/1925 | (IT) | ....................................... | 185/29 |

* cited by examiner

Primary Examiner—Tamara L. Graysay
Assistant Examiner—Colby Hansen

(57) ABSTRACT

A gravity motor using the potential energy of an initial mass located at a relative height. This potential energy can be converted into kinetic energy. This gravity motor comprises a storage bin (26) able to contain a quantity of fragmented material (39) and having a base (28) with a first chute (30) to take the fragmented material (39) out of the base (28), a second chute (34) with an exit (58) and a guiding cylinder (32) of the exit (58), a wheel (60) with vanes (61) that rotate a rotor (46). While rotating, each vane (61) can collect a volume of the fragmented material (39) and act as a torque around a central axis, thus causing the rotation of the wheel around the central axis, at a velocity corresponding to the kinetic energy of the volume of the fragmented material (39). The rotor (46) comprises means for articulated fastening to a machinery part.

6 Claims, 5 Drawing Sheets

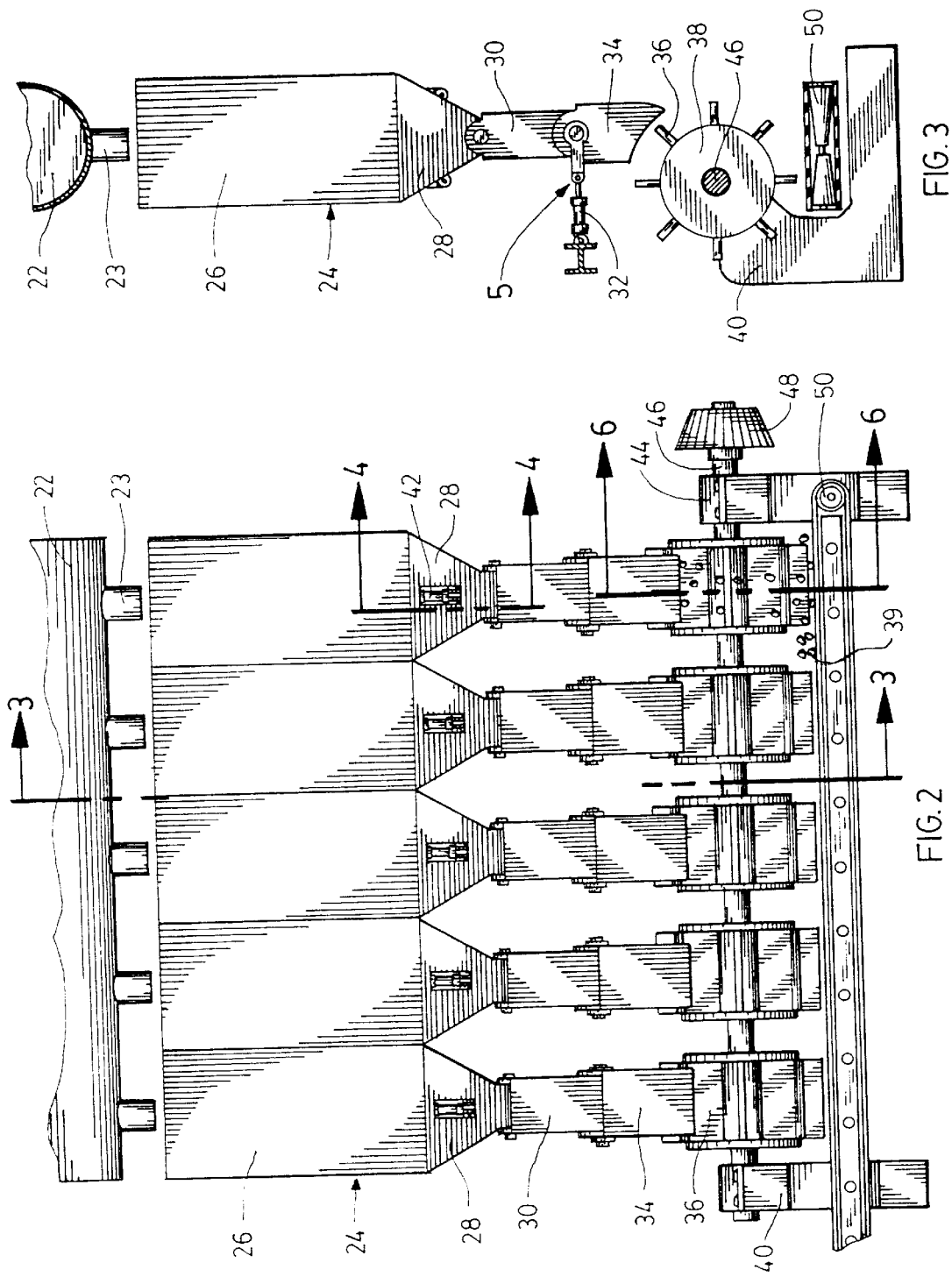

GRAVITY MOTOR

FIELD OF INVENTION

This invention belongs to the family of energy recuperator that feed gravity motors producing a special mode of energy. Specifically one related to mining pellets or concentrated ore used to activate a gravity motor.

BACKGROUND OF THE INVENTION

A review of the prior art has revealed the following patents:
U.S. Pat. No. 4,201,059; Feder, May 6th 1980 shows an elevator hopper.
FR 2,273,959; January 1976: a flywheel activated by free-falling.
IT 248,817; Rossi; 19 Nov. 1925 shows a number of flywheels.
FR 2,594,895; 28 Aug. 1987; Delecuse; a device activated by the weight of balls.

OBJECTIVES AND ADVANTAGES

The first objective of this invention is to provide an energy recuperator that produces a power unit that depends on the height of the fall of a fragmented material. Specifically it allows, in the absence of an electrical or a gas motor, the use of elevated fragmented materials to activate machinery or generate power.

Another objective is to use the potential energy of a mass located in a storage bin, at a certain height, and convert it into kinetic energy.

It comprises:
a downpipe
a number of vanes located at the foot of the downpipe and rotating around a central axis, each vane, while rotating, collecting a volume of the fragmented material, acting as a torque around the central axis, thus causing the rotation of a main shaft at a velocity corresponding to the kinetic energy of the volume of fragmented material. The arrangement of vanes also comprises means for articulated fastening to a machinery part.

Another objective is to provide means to reduce the rotary velocity of the fragmented material so that it can be used, as is, recycled or loaded in a boat.

SUMMARY OF THE INVENTION

A gravity motor using the potential energy of a mass located at a certain height, potential energy to be transformed through gravity into kinetic energy, the gravity motor comprising:

a storage bin to store, at a certain height, a volume of fragmented material, the storage bin comprising a base to allow the discharge of fragmented material, a first chute having a superior knee joint communicating with the base, the first chute further comprising means to activate fragmented material into exiting at the base, the first chute further having a distance of chute sufficient to accelerate a speed of fall of a discriminate part of volume of fragmented material and the transformation of potential energy into kinetic energy at the exit, a rotary part revolving around a central axis passing through a rotor attached to a vane holder wherefrom radially outspring a number of vanes, each vane passing through a collecting position under exit whereat the vane receives a discriminate part of the volume of fragmented material falling out of the exit, the vane acting as cantilever about the central axis and causing a rotation around central axis at a velocity corresponding to the kinetic energy of the discriminate part of fragmented material, the rotor part comprising rotating means for driving an output.

The gravity motor may comprise a second chute installed vertically under the first chute and comprising a distance of chute sufficient to further accelerate a speed of fall of the volume and the transformation of potential energy into kinetic energy and comprising at its bottom end an exit, the second chute comprising means for positioning the exit in line with an outer part of a passing vane.

BRIEF DESCRIPTION OF THE DRAWINGS

The present invention will be further understood from the following description with reference to the drawings in which:

FIG. 2 is a front elevation of the energy-saving device.

FIG. 3 is a section according to line 3—3 of FIG. 2.

DETAILED DESCRIPTION OF THE PREFERRED EMBODIMENT

Figure 1:
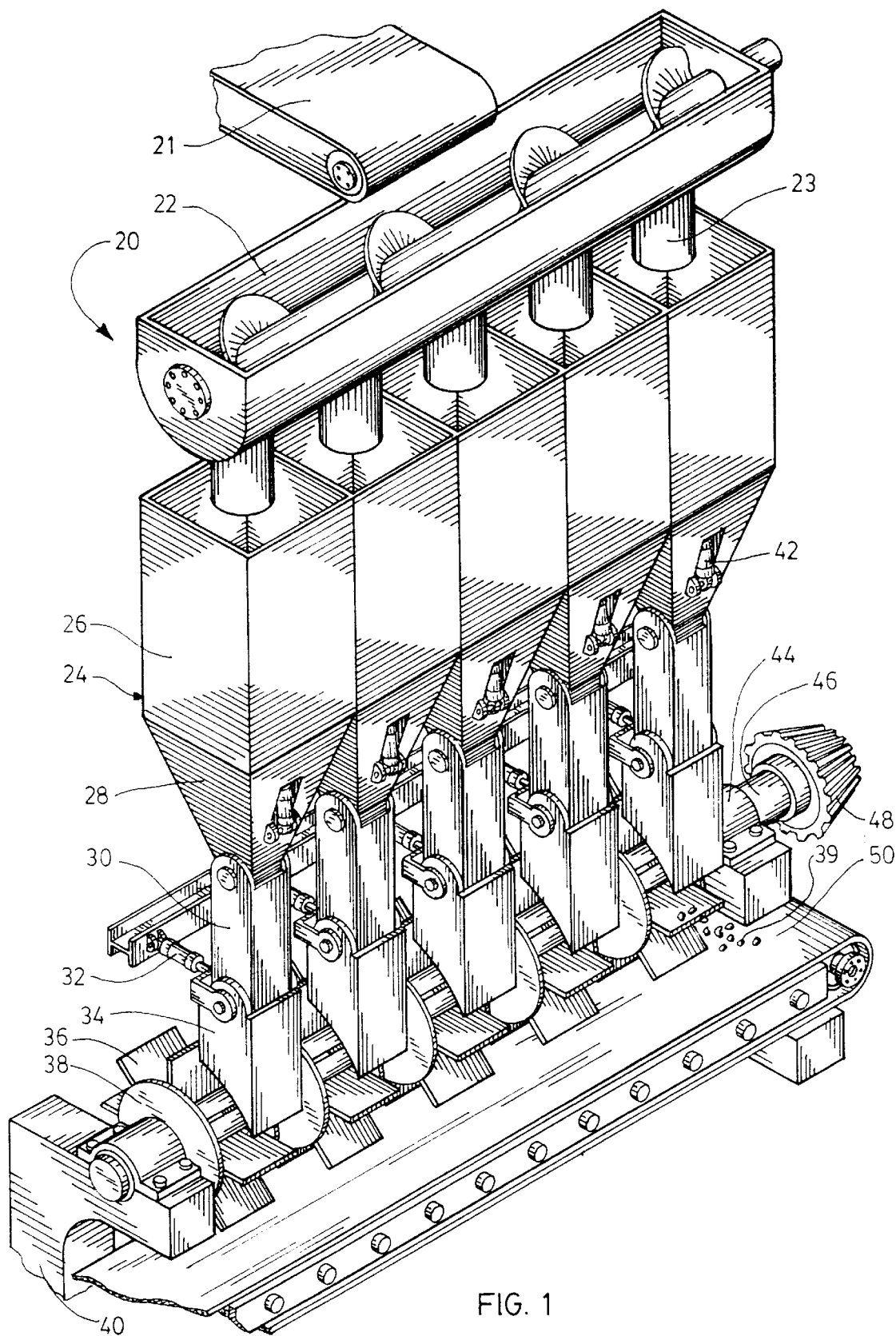
FIG. 1 is a perspective of a gravity motor of the energy-saving device.

The preferred embodiment of the invention is illustrated in FIG. 1 where the same characterizing elements are identified by the same numbers.

Figure 6:
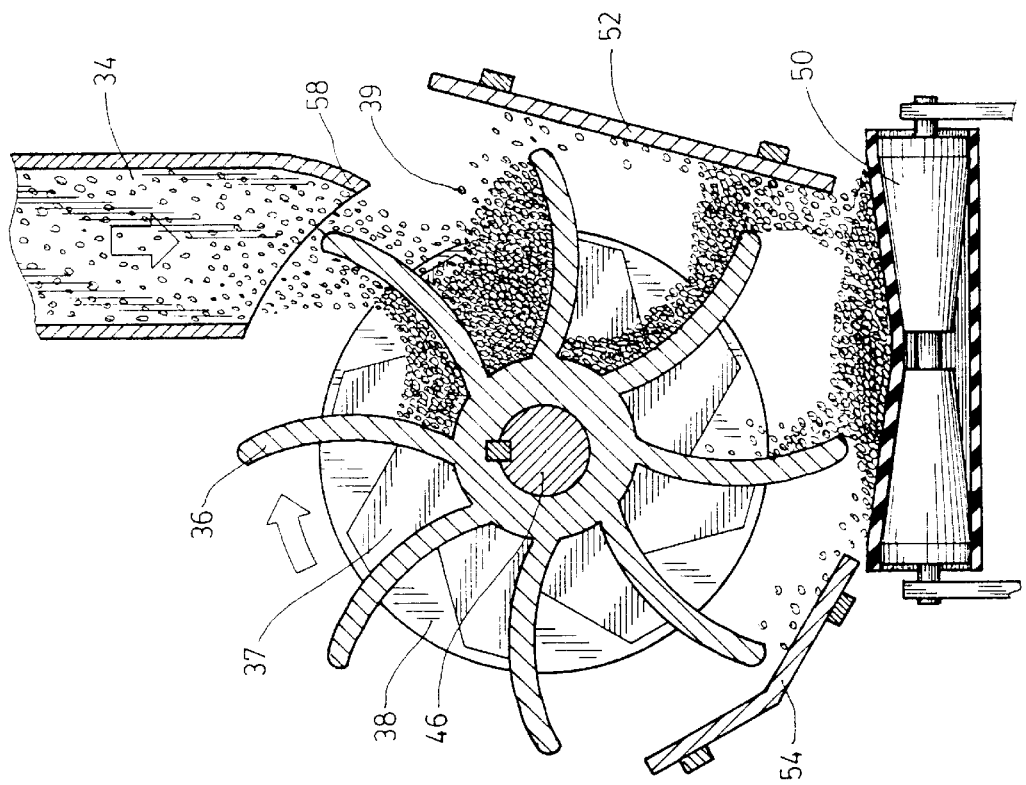
FIG. 6 is a section according to line 6—6 of FIG. 2

FIG. 1 shows an energy-saving gravity motor 20 particularly for use in mining, using ore. One sees under an input conveyor 21, a distribution auger 22 comprising a distribution pipe 23 to distribute fragmented material, like iron pellets 39 as shown in FIG. 6—FIG. 6—down a recuperation column 24, shown by an arrow, and made of a tower, a storage bin 26 ending in a funnel shape base 28 which includes an opening cylinder 42 which controls the flow of fragmented material 39, a first chute 30, pushed by a position cylinder 32 and feeding to a second chute 34, articulated on a junction point with the first chute 30. One also sees vanes 36 of a wheel 38 placed on a support structure 40 where a fastening collar 44 keeps in place a rotor 46 with a output gear 48 to couple with machinery, like an electricity generator. The discharge of the wheel 38 is located over a discharge conveyor 50.

FIG. 2 illustrates five recuperation columns 24, vertical and parallel with each other and perpendicular to the discharge conveyor 50. Fragmented material comes out of the funnel shape base 28 of the storage bin 26 and goes into the first chute 30 then the second chute 34 to then fall onto the vanes 36 and onto the discharge conveyor 50. One sees a distribution auger 22, a distribution pipe 23, a base 28, a support structure 40, an opening cylinder 42, a fastening collar 44, a rotor 46 and an output gear 48.

FIG. 3 shows the recuperation column 24. To cause the rotation of the vanes 36, there is a gap between the center of the wheel 38 that coincides with the rotor 46 and the centre of the second chute 34 and this gap must be at least equal to half of the radius of the wheel 38. One sees a distribution auger 22, a distribution pipe 23, a storage bin 26, a base 28, a first chute 30, a position cylinder 32, a support structure 40 and a discharge conveyor 50.

Figure 4:
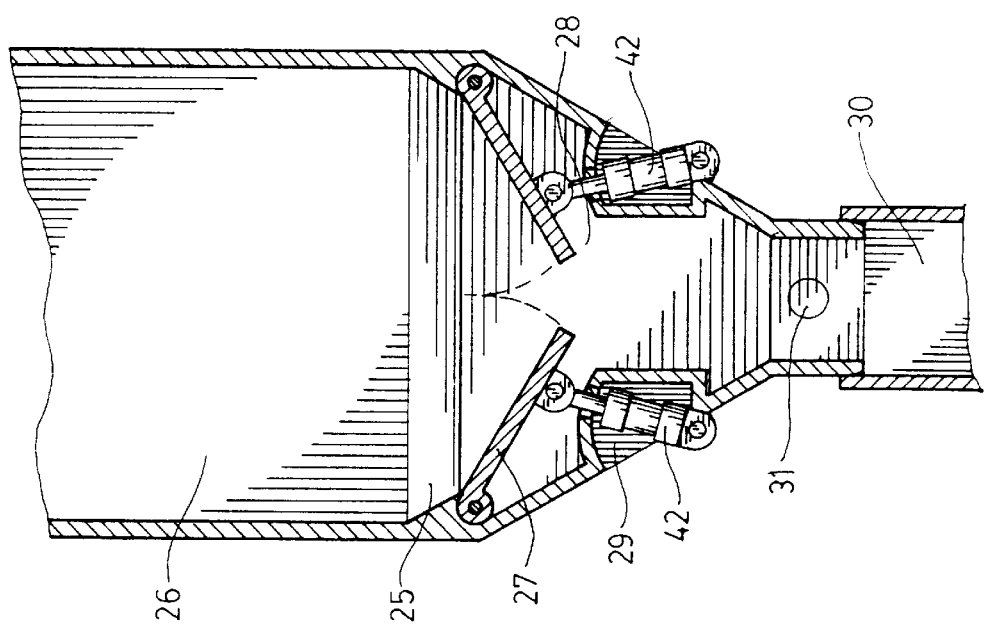
FIG. 4 is a section according to line 4—4 of FIG. 2.

FIG. 4 shows a sloped bottom 25 characterizing the wall of the base 28 giving it its funnel shape. Vibration shutters 27 are located on this sloped bottom 25 to serve as outflow shutters. One sees, in a space for cylinder 29, an opening cylinder 42, of hydraulic type, that moves the vibrations shutter 27. The displacement of the vibration shutter 27 is shown in dotted line. One sees a storage bin 26, a first chute 30, a superior knee joint 31 and an opening cylinder 42.

Figure 5:
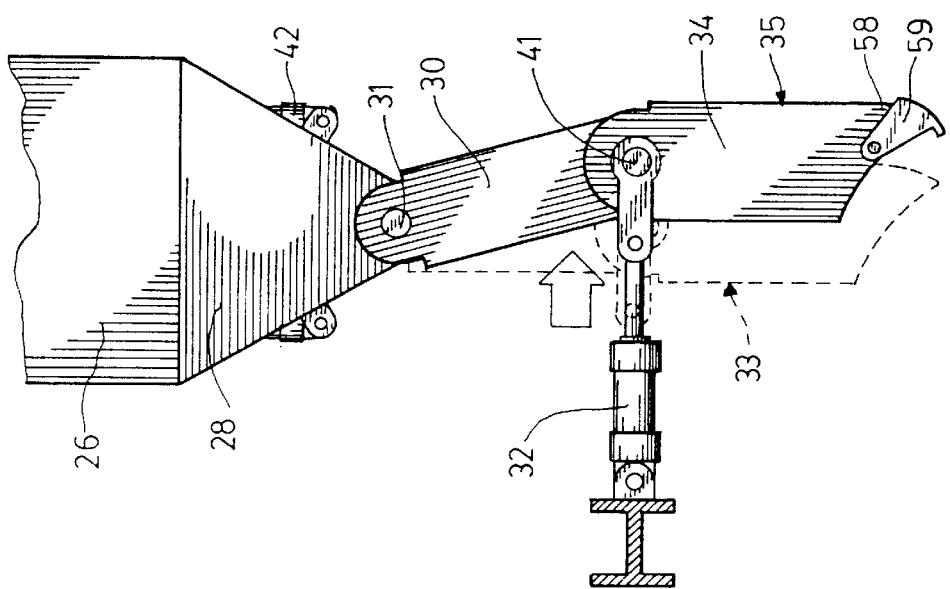
FIG. 5 is a detail of the area shown by arrow 5 of FIG. 3.

FIG. 5 shows the first chute 30, articulated and able to swing on a superior knee joint 31. A position cylinder 32, of a hydraulic type, moves the second chute 34 from a gravity position 33, shown in dotted line, to a forced position 35, by pushing on an inferior knee joint 41 moving an exit 58. At this exit 58 is a positioning valve 59.

FIG. 6 illustrates the second chute 34 from which iron pellets 39 fall onto vanes 36, reinforced by a stiffener plate 37. This causes the rotation of the rotor 46. The discharge conveyer 50 collects the iron pellets 39 that have fallen and are kept from straying by a front plate 52 and a rear plate 54. The stiffener plates 37 are placed so they join two vanes and strengthen them. These stiffener plates 37 are trapezoidal with one long side located near the rotor 46 so that a sloped side becomes almost vertical when the stiffener plate is in a position to receive the fragmented material 39 at its maximum velocity, and this to minimize interference.

Figure 7A:
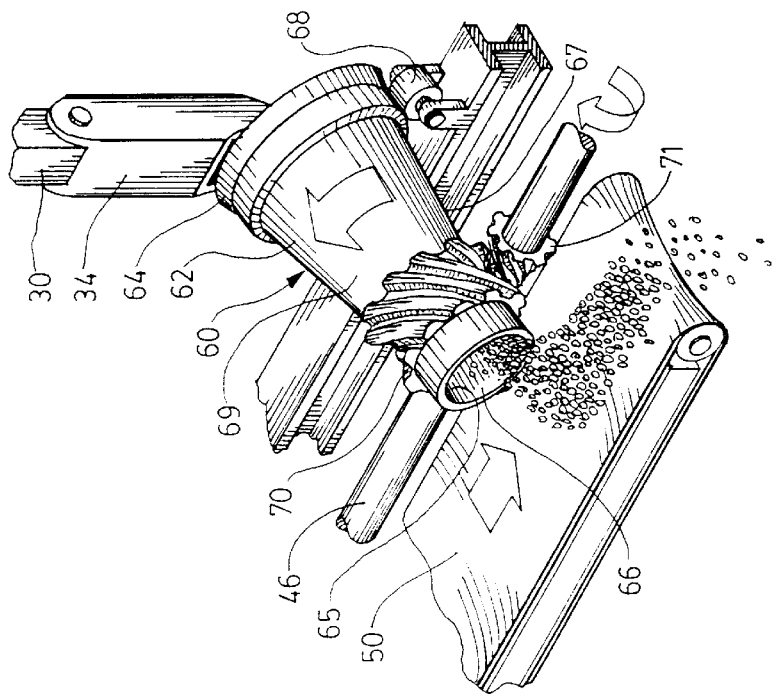
FIG. 7A is a perspective of an embodiment.

FIG. 7A shows a rotary part 60 that is a truncated cone 62 with an inner face 65, an outer face 69, two large and small diameter ends 64 and 66, and a cone length 67. The long diameter end 64 collects the fragmented material 39 and the short diameter end 66 discharges it. The cone length 67 is proportional to the size of the diameters. The long diameter end 64 turns on rollers 68 and the short diameter end 66 has a 90 degree gear 70 that engages a control screw 71 of the rotor 46.

Figure 7C:
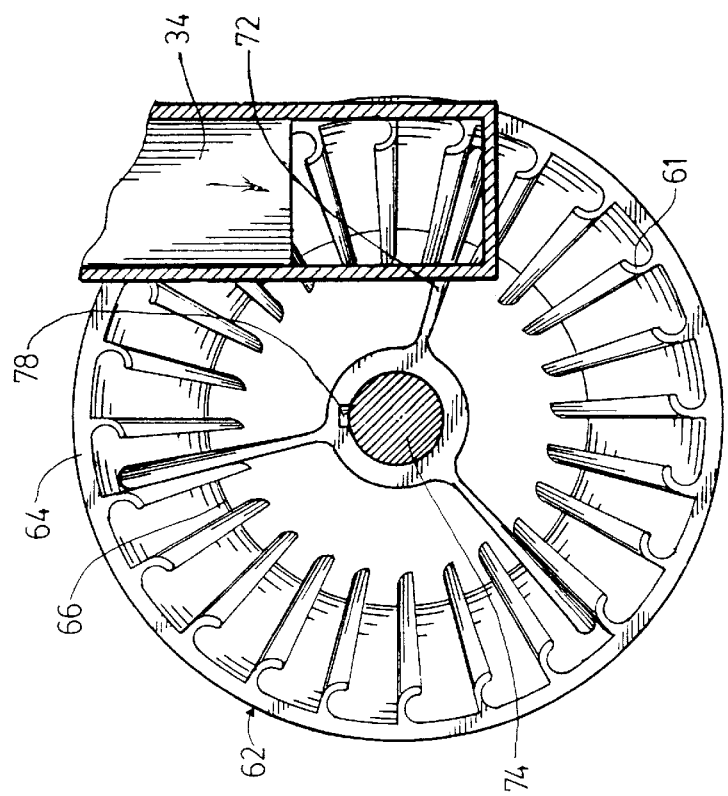
FIG. 7C is a front view according to line 7C—7C of FIG. 7B.
Figure 7B:
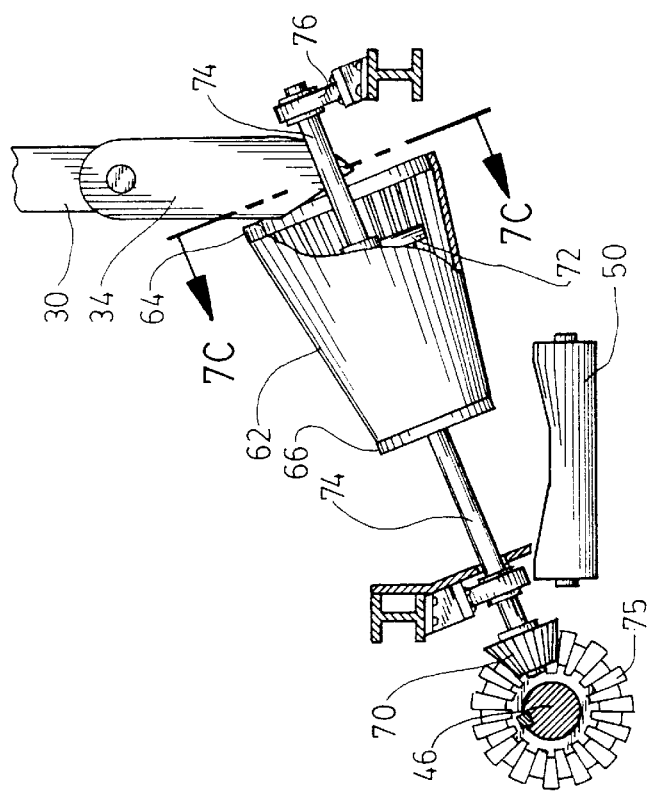
FIG. 7B is a side view of the embodiment of FIG. 7A.

FIG. 7B illustrates the truncated cone 62 fixed on three radial supports 72 protruding from a countershaft 74 placed on bearings 76. The countershaft 74 rotates the 90 degree gear 70 that engages the output gear 48 that rotates the rotor 46.

FIG. 7C illustrates the truncated cone 62 with its longer diameter end 64 and shorter diameter end 66. There are also vanes 61, the radial supports 72, the countershaft 74 and a keyway 78. One also sees the second chute 34, in dotted line, and the fragmented material 39 falling onto the tip of the vanes 61.

The present gravity motor may be used where there is granular material at a certain height. Like on mountain sides, in a quarry, in mines, or it can be adapted to a silo or a boat with a deep hull. This system may also be autonomous: the material, once elevated possesses a potential energy due to gravity equal to mgh, where m=mass, g=gravitational acceleration and h=height.

The height of the fall turns the potential energy into kinetic energy at a location corresponding to the tip of the vanes of a turbine. The kinetic energy is equal to ½mv². Where the mass is applied, with the velocity obtain by the fall, the initial energy is equal to the final energy that is mgh=½mv², where v²=2 gh, v=(2 gh)$^{0.5}$. In the imperial system, g=32 feet/sec/sec, v=8(h)$^{0.5}$. For a height of 49 feet, v=56 feet/sec. In the metric system g=9,8 m/sec/sec, v=(20× 16)$^{0.5}$. The mass reaches the tip of the vanes at the velocity of 56 feet/sec (18 m/sec) which correspond to a peripheral velocity of about 50 feet/sec. If a turbine has a diameter of 16 feet, one rotation per second, 60 rotations per minute, the velocity is given by the formula:

$$v=n/60*\pi*d=60/60*\pi*16=50 \text{ feet/sec.}$$

Application in space. If g=0, there is no velocity, but if g is four times higher than on Earth, the height is four time shorter, so instead of 50', one only needs 12 feet.

Another physical phenomenon explains the reaction of a vane 36 to a mass that falls onto its tip at a given velocity, and it is the momentum. A particle of a mass m hits a vane 36 at a velocity v. The weight of the vanes with their center core or support multiplied by the velocity produces a momentum equal to the one of the group of particles at a velocity v. For example, if the velocity for a 16' fall is of 32 feet/sec. and if a little more than one cubic foot/minute or 5 lb. per second falls onto a vane, the momentum is 32×5=160 feet-lb./sec that is transferred to a vane to make it rotate around a central pivot and then a new impulse is applied onto the following vane. For this reason it is preferable that the outside periphery of the vanes be as light as possible and yet be able to travel at a high speed so that their velocity could approach that of the falling balls.

A method without storing in the storage bin 26 may be applied where there is a need for an instant energy recuperation. It is possible to use directly the distribution system 22 and to let the pellets fall directly from the distribution pipes 23 thus eliminating storage bin 26, base 28, first chute 30 and second chute 34 to obtain a fall that is significantly higher. In this case, the positioning valve 59 may be used as guiding means to position the pellets towards the tip of a vane. One can also add a reciprocating motion to the shutter 27 by reciprocating opening cylinder 42; one could also reciprocate position cylinder 32 to reciprocate second chute 34 as means for regulating the outflow passing through the first chute 30; electrical or mechanical means to synchronize this outflow with the rotation of the vanes. As for the opening cylinder 42, that is used in cooperation with a storage bin, it is preferably a flow regulating hydraulic cylinder.

The fragmented material 39 may he iron ore pellets or even denser concentrates. One may increase humidity a little in silos to insure that the ore stays in pellet form and does not produce too much dust. The pellets or fragmented material 39 may fall one piece after the other or in a group, intermittently. The quantity of ore may be adjusted according to the weight of the rotary part, to get the desired velocity. At a peripheral velocity of 32 feet/sec., a rotary part of four feet in diameter has an rpm of 160.

The vanes 36 may take various shapes and be located in many places. A drum or rotary part 60 takes the shape of a truncated cone 62 with vanes placed inside the drum, instead of originating from a main shaft. There is a countershaft 74, inside the rotary part 60 and supported by radial supports 72. The rotary part 60 is mounted, at the long diameter end 64, on rollers 68 and, at the short diameter end 66, onto a 90 degree gear 70 that activates the output gear 48 that drives an outlet. There can be an uncoupling between two systems for maintenance. The vanes 36 may take various angular positions and may possess deflectors or other means for fastening to insure that the momentum is at a maximum, for causing a rotation of the rotary part instead of throwing the fragmented material 39 out at a velocity over 0.

The position of the cone 63 may vary according to the material used, depending on its density, the abrasion of the material, the size of the pellets, the conicity of the truncated cone; the angle may vary between −5° and 35°.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given. Other embodiments are possible and limited only by the scope of the appended claims:

PARTS LIST

| | | | |
|---|---|---|---|
| 20 | Gravity motor | 54 | Rear plate |
| 21 | Input conveyor | 56 | Downpipe |
| 22 | Distribution auger | 58 | Exit |
| 23 | Distribution pipe | 59 | Positioning valve |
| 24 | Recuperation column | 60 | Rotary part |
| 25 | Sloped bottom | 61 | Vanes |
| 26 | Storage bin | 62 | Truncated cone |
| 27 | Shutter | 63 | Position of the cone |
| 28 | Base | 64 | Long diameter end |
| 29 | Space for cylinder | 65 | Inner face |
| 30 | First chute | 66 | Short diameter end |
| 31 | Superior knee joint | 67 | Cone length |
| 32 | Position cylinder | 68 | Rollers |
| 33 | Gravity position | 69 | Outer face |
| 34 | Second chute | 70 | 90 degree gear |
| 35 | Forced position | 71 | Control screw |
| 36 | Vanes | 72 | Radial support |
| 37 | Stiffener plate | 74 | Countershaft |
| 38 | Wheel | 76 | Bearing |
| 39 | Fragmented material | 78 | Keyway |
| 40 | Support structure | | |
| 41 | Inferior knee-joint | | |
| 42 | Opening cylinder | | |
| 44 | Fastening collar | | |
| 46 | Rotor | | |
| 48 | Output gear | | |
| 50 | Discharge conveyor | | |
| 52 | Front plate | | |

I claim:

1. A gravity motor using the potential energy of a mass located at a certain height, said potential energy to be transformed through gravity into kinetic energy, said gravity motor comprising:

a storage bin (26) to store, at a certain height, a volume of fragmented material (39), said storage bin comprising a base (28) to allow the discharge of said fragmented material (39), a first chute (30) having a superior knee joint (31) communicating with said base, said first chute (30) further comprising means to activate said fragmented material (39) into exiting said base (28), said first chute (30) further having a distance of chute sufficient to accelerate a speed of fall of a discriminate part of said volume of said fragmented material (39) and the transformation of said potential energy into kinetic energy at an exit (58), a rotary part (60) revolving around a central axis passing through a rotor (46) attached to a vane holder wherefrom radially outspring a number of vanes (36), each of said vanes (61) passing through a collecting position under said exit (58) whereat said vane (61) receives said discriminate part of said volume of said fragmented material (39) falling out of said exit (58), said vane acting as cantilever about said central axis and causing a rotation around said central axis at a velocity corresponding to said kinetic energy of said discriminate part of said volume of fragmented material (39), said rotor part (60) comprising rotating means for driving an output (48), said storage bin (26) having a height and a width, and being superposed upon said base (28), said base (28) comprising a sloped bottom (25) and at least one outflow shutter (27) mounted against said sloped bottom (25), said shutter (27) having an inclined face and a cylinder for reciprocating displacement of said inclined face so as to cause the release of discriminate parts of said volume of said fragmented material.

2. The gravity motor of claim 1 comprising a second chute (34) installed vertically under said first chute (30) and comprising a distance of chute sufficient to further accelerate a speed of fall of said volume and the transformation of said potential energy into kinetic energy and comprising at its bottom end said exit (58), said second chute (34) comprising means for positioning said exit (58) in line with an outer part of said passing vane.

3. The gravity motor of claim 2 wherein said storage bin (26) is part of a number of aligned storage bins topped by a distribution auger (22) feeding a number of distribution pipes (23) adapted to fill said aligned storage bins (26).

4. The gravity motor of claim 2 wherein there are two of said outflow shutters (27), each of said shutters (27) having a gradient angle and a length sufficient to partly support said fragmented material (39), the discharge of said fragmented material (39) causing a mass vibration that causes a vibrating displacement; said gradient angle varying from 0 to 30 and said length varying from 25% to 50% of said length of said storage bin (26).

5. The gravity motor of claim 4 wherein said outflow shutters (27) are supported by an opening cylinder (42) fastened to a wall of said sloped bottom (25) to regulate said outflow.

6. The gravity motor of claim 1 wherein said first chute (30) comprises an inferior knee-joint (41) articulated to said second chute, a position cylinder (32) being mounted externally of said second chute (34) and fastened to said inferior knee-joint (41) of said first chute (30) so that both said first and second chutes move together, said position cylinder guiding said exit (58) towards said collecting position of said vane (61).

\* \* \* \* \*